United States Patent
Chan (10) Patent No.: US 9,215,115 B1
(45) Date of Patent: Dec. 15, 2015

(54) APPARATUS AND METHOD FOR IMPROVED INTEGRATION CIRCUITRY IN DECISION FEEDBACK EQUALIZATION

(71) Applicant: Altera Corporation, San Jose, CA (US)

(72) Inventor: Allen Chan, San Jose, CA (US)

(73) Assignee: Altera Corporation, San Jose, CA (US)

( * ) Notice: Subject to any disclaimer, the term of this patent is extended or adjusted under 35 U.S.C. 154(b) by 355 days.

(21) Appl. No.: 13/692,147

(22) Filed: Dec. 3, 2012

(51) Int. Cl.
*H03H 7/40* (2006.01)
*H04L 27/01* (2006.01)

(52) U.S. Cl.
CPC ........................................ *H04L 27/01* (2013.01)

(58) Field of Classification Search
None
See application file for complete search history.

(56) References Cited

U.S. PATENT DOCUMENTS

2004/0240539 A1* 12/2004 Shanbhag et al. ............ 375/233
2006/0227912 A1* 10/2006 Leibowitz et al. ............ 375/350

* cited by examiner

*Primary Examiner* — Michael D Yaary
(74) *Attorney, Agent, or Firm* — Guadalupe M. Garcia (57) ABSTRACT

An embodiment of the present invention implements a linear feedback shift register (LFSR) as a counting device for an integrator of a DFE circuit. In embodiments of the present invention, the particular count sequence need not be known, instead only boundary values need be known. For example, for a LFSR having a predetermined count sequence, a digital integrator controller need not know every value of the count sequence. Instead, the digital integrator controller detects predetermined boundary values such as a minimum or maximum count.

24 Claims, 7 Drawing Sheets

Fig. 3B
Integrator=32

Fig. 3C

Fig. 3D
Integrator=1500

APPARATUS AND METHOD FOR IMPROVED INTEGRATION CIRCUITRY IN DECISION FEEDBACK EQUALIZATION

FIELD OF THE INVENTION

The present invention generally relates to the field of digital communications. More particularly, the present invention relates to decision feedback equalization as implemented in digital communications.

BACKGROUND OF THE INVENTION

Decision Feedback Equalization (DFE) is based on the principle that once the value of the current transmitted symbol has been determined, the contribution of intersymbol interference (ISI) to future received symbols can be removed. DFE has a nonlinear feature that is due to a decision device that attempts to determine which symbol of a set of discrete levels was actually transmitted. Once the current symbol has been decided, a filter structure calculates the ISI effect it would tend to have on subsequent received symbols and, thereafter, compensate the input to the decision device for subsequent samples. This post-cursor ISI removal is accomplished by the use of, among other things, a feedback filter structure.

From one perspective, a purpose of an equalizer in general is to compensate for the backplane attenuation due to insufficient bandwidth. More particularly, the DFE works by actively cancelling out signal distortion based on the history of the received data. The DFE does this by removing signal energy that may have leaked from one bit to a following bit which cancels out post-cursor distortion caused by inter symbol interference. In a DFE, the magnitude of the tap coefficient requires either manual tuning or leverages a form of an autonomous adaptation scheme, for example. In certain modern applications that require ever increasing data rates, they also require high performance from their DFE adaptation circuitry. These modern applications, however, also have stringent silicon real estate demands where the DFE adaptation circuitry is preferred to be as small as possible.

In typical implementations, reduced steady state error is achieved by implementing DFE adaptation circuitry with high integration values. High integration values are achieved with traditional look-ahead or ripple counters that can have performance limitations with regard to operational frequencies or can require large silicon real-estate.

SUMMARY OF THE INVENTION

There exists a need in the art for a DFE circuit with high performance but with preferably reduced circuit complexity. There is a further need to provide high accuracy performance with reduced circuit complexity.

An embodiment of the present invention implements a linear feedback shift register (LFSR) as a counting device for an integrator of a DFE circuit. In embodiments of the present invention, the particular count sequence need not be known. In such an embodiment, instead boundary values are known. For example, for a LFSR having a predetermined count sequence, a digital integrator controller need not know every value of the count sequence. Instead, the digital integrator controller detects predetermined boundary values.

For example, a LFSR according to an embodiment of the present invention is implemented as a pseudo-random generator having a predetermined count sequence of predetermined length. A digital integrator control circuit according to an embodiment of the present invention is configured to detect boundary values such as maximum count sequence.

In other embodiments, a counter for use in an integrator of a DFE circuit is controlled to increment or decrement though a predetermined sequence. In another embodiment, boundary values include a minimum or maximum count value. In still another embodiment, a counter can be loaded with a predetermined seed value.

These and other embodiments can be more fully appreciated upon an understanding of the detailed description of the invention as disclosed below in conjunction with the attached figures.

BRIEF DESCRIPTION OF THE DRAWINGS

The following drawings will be used to more fully describe embodiments of the present invention.

DETAILED DESCRIPTION OF THE INVENTION

The following description is of certain preferred embodiments presently contemplated for carrying out this invention. This description is made for the purpose of illustrating the general principles of this invention and is not meant to limit the inventive concepts claimed herein.

The operation of a DFE can be generally understood as follows. Assuming that a channel is linear time-invariant (LTI), intersymbol interference (ISI) can be described as a deterministic superposition of time-shifted smeared pulses. Advantageously, the DFE uses information about previously received bits to cancel out their ISI contributions from the current decision. In general, a DFE is implemented to remove post-cursor ISI, e.g., the ISI introduced from past bits.

Figure 1:
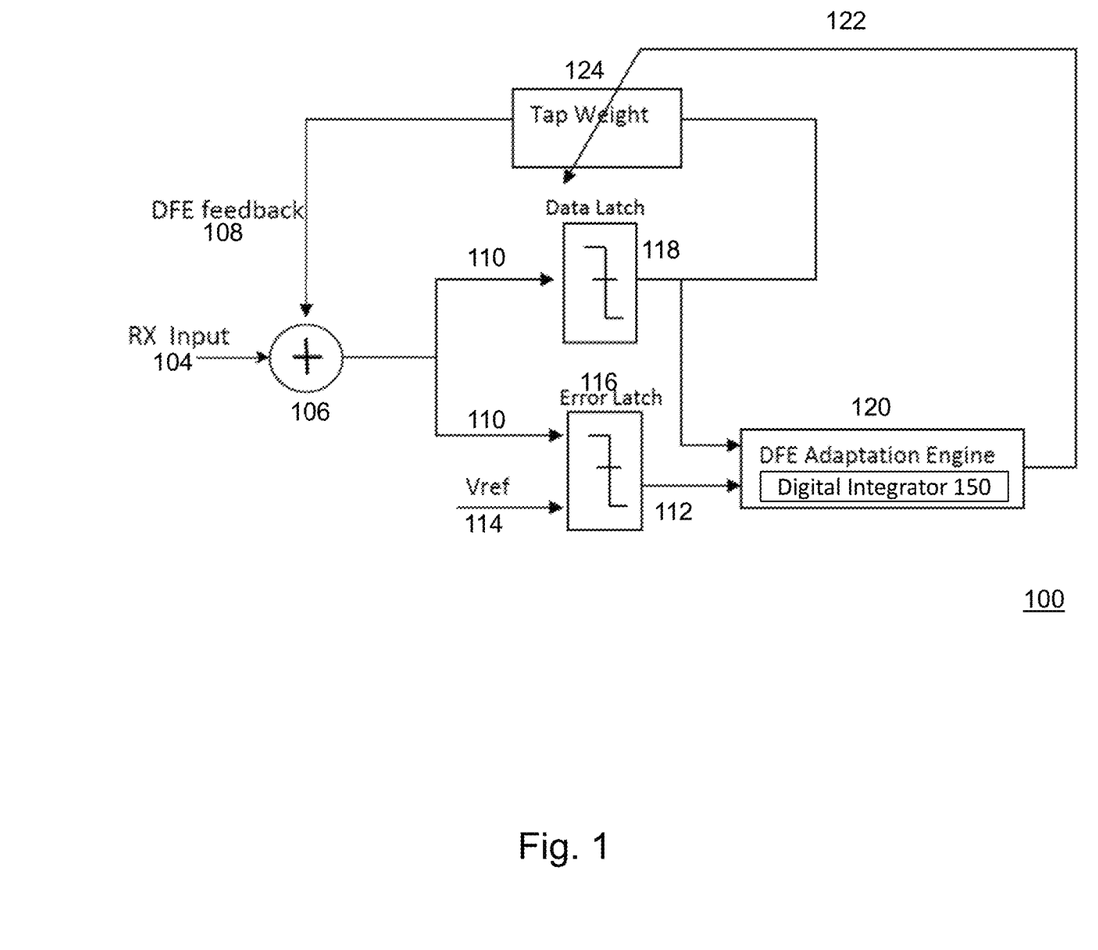
FIG. 1 is a block diagram of a decision feedback circuit on which embodiments of the present invention can be implemented....

Shown in FIG. 1 is a block diagram for Decision Feedback Equalizer (DFE) adaptation circuit 100 on which certain aspects of the present invention may be practiced. An aspect of DFE adaptation circuit 100 is that it automatically adapts to time-varying properties of the communication channel and received RX input 104. As shown, RX input 104 is summed with DFE feedback signal 108 to generate signal 110 that is input to both data latch 118 and error latch 116. Error latch 116 further receives a reference signal Vref 114 to which signal 110 is compared. Error latch output signal 112 is, therefore, dependent on the level of signal 110 relative to Vref 114. Error latch output signal is input to DFE Adaptation Engine 120. DFE adaptation engine also receives as input data latch output signal 118. Data latch output signal 118 is generated by latching the received signal 110. DFE Adaptation Engine, using inputs as error latch output signal 112 and data latch output signal, then provides an output DFEAE signal 122 that is used to set the various weights of Tap Weight block 124. Using data latch output signal 118 with the appropriate weighting as set by Tap Weight Block 124, DFE feedback signal 108 is generated. In this way DFE adaptation circuit is essentially a filter that uses feedback of detected symbols (e.g., data latch output signal 118) in addition to conventional equalization of future symbols to automatically adapt to time-varying properties of the communication channel.

In operation where there is no intersymbol interference (ISI), the received signal level 104 should substantially be the same as reference voltage 114. But because of ISI that is seen in many practical applications, a low frequency signal is observed that creates a received signal 104 that is larger than reference voltage 114, and a high frequency signal is observed that creates a received signal 104 that is lower than reference voltage 114. In operation, the comparison output 112 from Error Latch 116 is used by DFE adaptation engine 120 to determine if higher DFE gain is required (e.g., change tap weights). But any wrong decision of Error Latch 116 such as caused by the low frequency and high frequency effects discussed above can create problems with convergence of the DFE adaptation.

An embodiment of the present invention provides for an improved DFE adaptation engine 120 that includes digital integrator 150 that achieves high performance without sacrificing functionality or area utilization. In an embodiment digital integrator 150 serves, for example, as an averaging filter. In the case of the adaptation engine 120 it averages the product of the sign error.

In DFE implementations, there has traditionally been a tradeoff between the digital integration value and steady state error. For example, whereas a large integration value is desirable because it reduces error, a large integration value traditionally also requires increased, sometimes significantly increased, logic utilization. Conversely, smaller integration values may simplify a circuit design, but such an implementation can lead to increased steady state error. Such increased errors can manifest themselves as increased distortion at the summing node of the DFE.

Figure 2A:
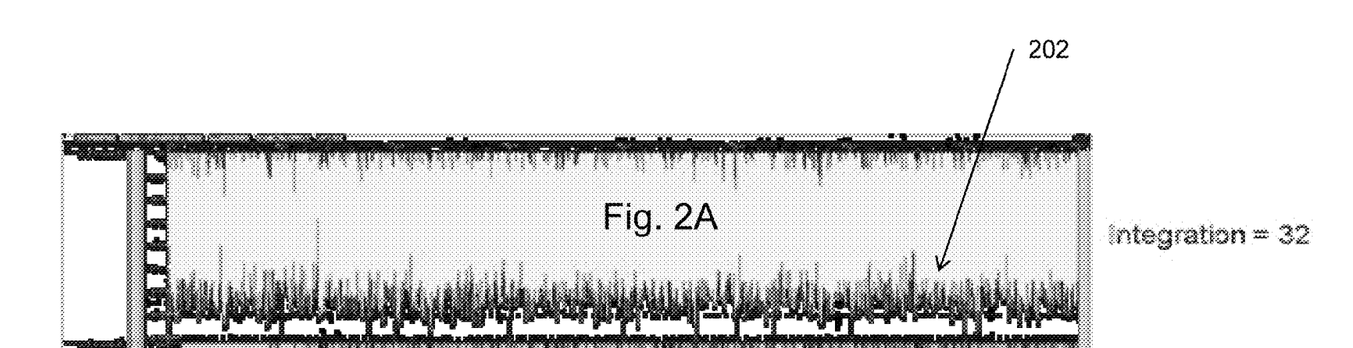
FIGS. 2A and 2B are graphs that illustrate the effect of integration count values on a DFE circuit.
Figure 2B:
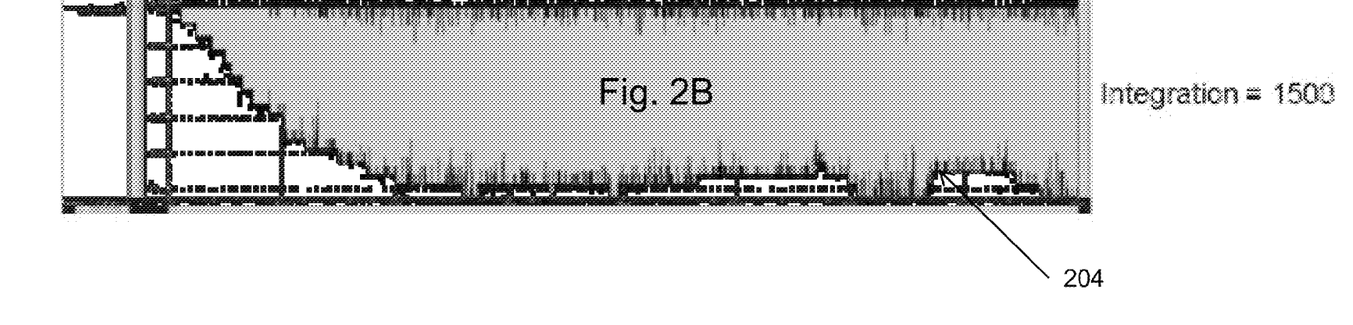

Shown in FIGS. 2A and 2B are illustrations of transient response at the summing node of an exemplary DFE circuit as implemented within a Programmable Logic Device (PLD) as affected by the integration value. Shown in FIG. 2A is the summing node signal with a relatively small integration value of 32 integrations. Shown in FIG. 2B is the summing node signal with a lager integration value of 1500 integrations.

As shown in FIG. 2A, the summing node signal converges relatively quickly but has relatively high steady state fluctuations 202. Shown in FIG. 2B, however, is a demonstration of how the summing node signal converges more slowly than as shown in FIG. 2A for fewer integrations, but, as shown in FIG. 2B, steady state fluctuations 203 are significantly lower when compared with FIG. 2A that corresponds to a smaller integration value.

Figure 3A:
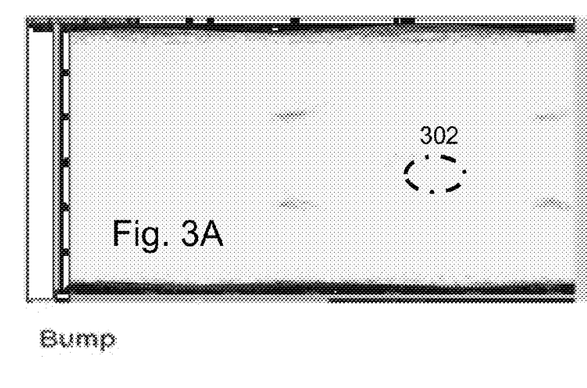
FIGS. 3A-3D are eye diagrams that illustrate the effect of integration count value on a DFE circuit.
Figure 3B:
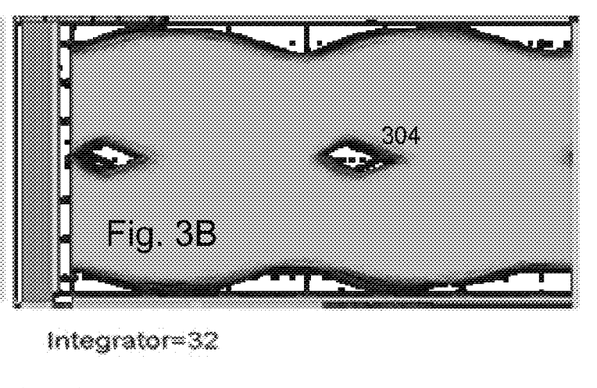
Figure 3C:
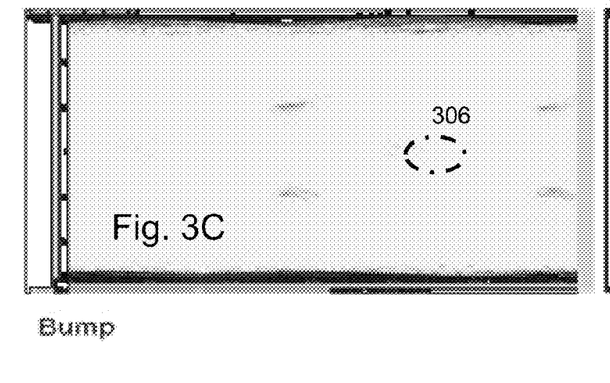
Figure 3D:
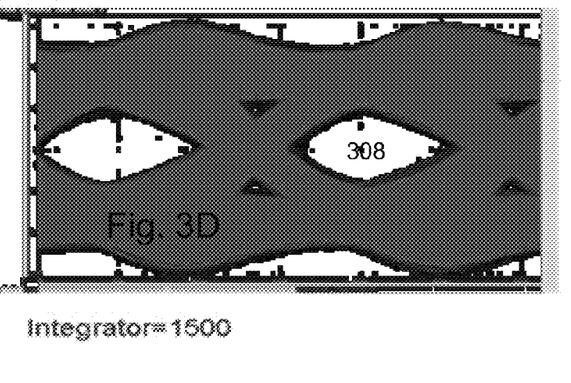

In typical DFE implementations, higher distortion decreases the quality of results to which the adaptation engine converges. Conversely, lower distortion increases the quality of the results. Eye diagrams as known in the art and as shown in FIGS. 3A-3D. For example, shown in FIG. 3A is an eye diagram for an incoming received signal as may be an input to a DFE circuit. Note the absence of any significant eye in area 302. When processed by a DFE circuit in an exemplary implementation, however, eye 304 is formed from the received signal of FIG. 3A with a digital integrator performing 32 integrations. Shown in FIG. 3C is an eye diagram for an incoming received signal as may be an input to a DFE circuit. Again, note the absence of any significant eye in area 306. When processed by a DFE circuit in an exemplary implementation, however, eye 308 is formed from the received signal of FIG. 3C with a digital integrator performing 1500 integrations. Importantly, eye 308 when compared to eye 304 demonstrates the increased discrimination of signals using a larger integration value.

It can be appreciated by those of ordinary skill in the art that larger integration values can be desirable in a DFE circuit. In typical implementations, however, larger integration values generally lead to increased circuit complexity. A challenge with digital integrator design is to support a large integration value while still meeting high bandwidth requirements and silicon real-estate constraints. For example, traditional digital integrators that may implement binary counters such as ripple counters or carry look ahead counters may exhibit performance limitations or incur an area and power penalty.

A ripple carry architecture is generally straightforward to implement, but the bandwidth can be significantly limited due to the propagation of the carry signal across the count elements. For example, the carry signal has to propagate through the various counter elements within one clock cycle while still meeting the timing parameters of the register element. Increasing the integration value to reduce steady state error will amplify this limitation because the carry signal will need to propagate across more count elements. For gigahertz applications, a ripple counter may not meet operational requirements.

The carry look ahead architecture eliminates the propagation of a carry signal across the count elements, but as the integration size is increased so does the complexity of the combinatory logic for the carry look ahead. In certain implementations, there is an exponential increase in area and logical level as the integration value grows. Circuit techniques have been developed (e.g., dynamic logic) that can improve performance, but such techniques also require more silicon area and increases power consumption—two things that are preferred to be kept down in modern applications.

An embodiment of the present invention includes a DFE circuit architecture with high operating performance that can meet stringent area and power requirements. In an embodiment, high integration values are achieved using a low complexity circuit such as implemented using a pseudo-random generator. Embodiments of the present invention provide for a high speed digital feedback equalization adaptation engine.

Figure 4:
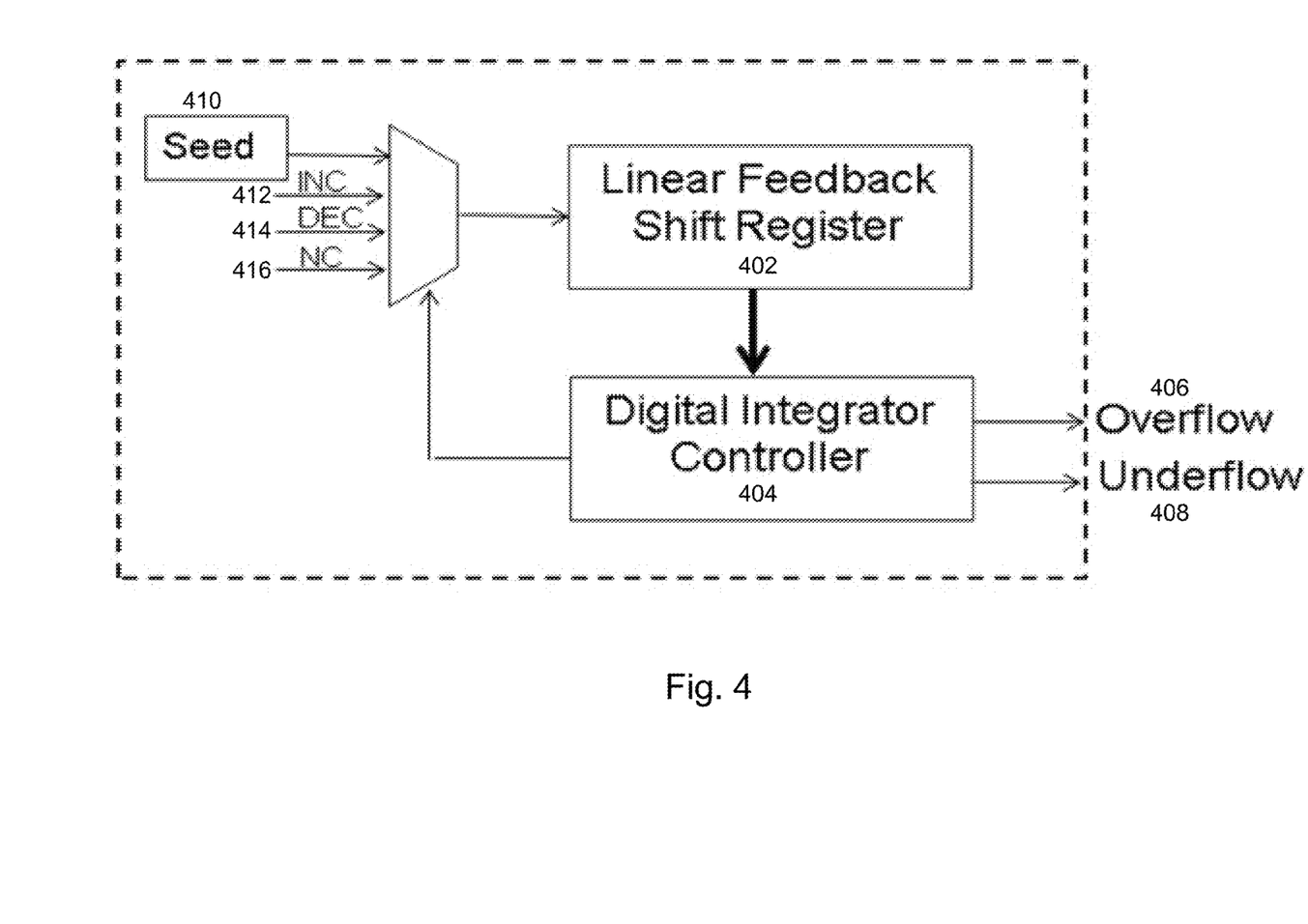
FIG. 4 is a block diagram of a counter for a digital integrator of a DFE circuit according to an embodiment of the present invention.

Shown in FIG. 4 is circuitry for an integrator as implemented in a DFE adaptation engine. As shown in FIG. 4, linear feedback shift register (LFSR) 402 is provided as a counter for digital integrator controller 404. Architectures for LFSRs, according to embodiments of the present invention, reduce register-to-register delay as compared to traditional binary counters, for example. As a result, embodiments of the present invention can operate at higher frequencies. In embodiments of the present invention, the combinatory logic for LFSR 402 is greatly reduced when compared to other counters. As a result, embodiments of the present invention provide for reduced area utilization and lower power consumption.

According to an embodiment of the present invention, LFSR 402 provides a count sequence of a predetermined length. In an embodiment, the order of the count sequence need not be known. For example, an embodiment of the present invention implements LFSR 402 that has a count sequence of 31. In such an embodiment, Digital Integrator Controller 404 need not known the each value of the sequence of the 31 counts, only that the predetermined count has been reached. When such a predetermined count has been reached, Digital Integrator Controller, according to an embodiment of the present invention, outputs a signal such as Overflow signal 406 or Underflow signal 408.

As further shown in FIG. 4, increment signal 412 is provided as input to LFSR 402 so as to control the order of the count sequence of LFSR 402. For example, in an embodiment, responsive to increment signal 412, LFSR 402 increasingly counts through a sequence of values. Responsive to a maximum count of LFSR 402 that is provided to Digital Integrator Controller 404, Digital Integrator Controller outputs Overflow signal 406.

As further shown in FIG. 4, decrement signal 414 is provided as input to LFSR 402 so as to control the order of the count sequence of LFSR 402. For example, in an embodiment, responsive to decrement signal 414, LFSR 402 decreasingly counts through a sequence of values. Responsive to a minimum count of LFSR 402 that is provided to Digital Integrator Controller 404, Digital Integrator Controller outputs Underflow signal 408. Also shown in FIG. 4, no change signal 416 is provided as input to LFSR 402 so as to disable counting associated with LFSR 402. For example, in an embodiment, responsive to no change signal 416, LFSR 402 stops counting.

In an embodiment, when an accumulator reaches a predefined threshold, it may assert either the increment signal 412 or or the decrement signal 414 depending on the accumulation of +1 or −1 errors. Otherwise, it will assert no change signal 416. In such and embodiment, the integrator essentially averages the increment, decrement, and no change values. Advantageously, the integration of these values ensures stability and convergence of the closed loop system. Without such an implementation, the system may be unstable. Moreover, Overflow signal 406 or Underflow signal 408 are the products of the increment, decrement, and no change integrated values. In an embodiment, where the integrator is implemented as a ring counter, when the ring counter reaches a predefined count value, it assert either Overflow signal 406 or Underflow signal 408, depending on the integrated value of the increment, decrement, or no change assertions. In such an embodiment, the overflow and underflow of the integrator is fed into a tap weigh accumulator where it sets the values of the DFE coefficients.

Further shown in FIG. 4 is Seed signal 410 that provides a predetermined input to LFSR 402. In this way, the starting point of LFSR 402 can be known. Also, increment and decrement counts can also be known. In an embodiment, no count signal 416 is provided so as to prevent LFSR 402 from counting.

Figure 5:
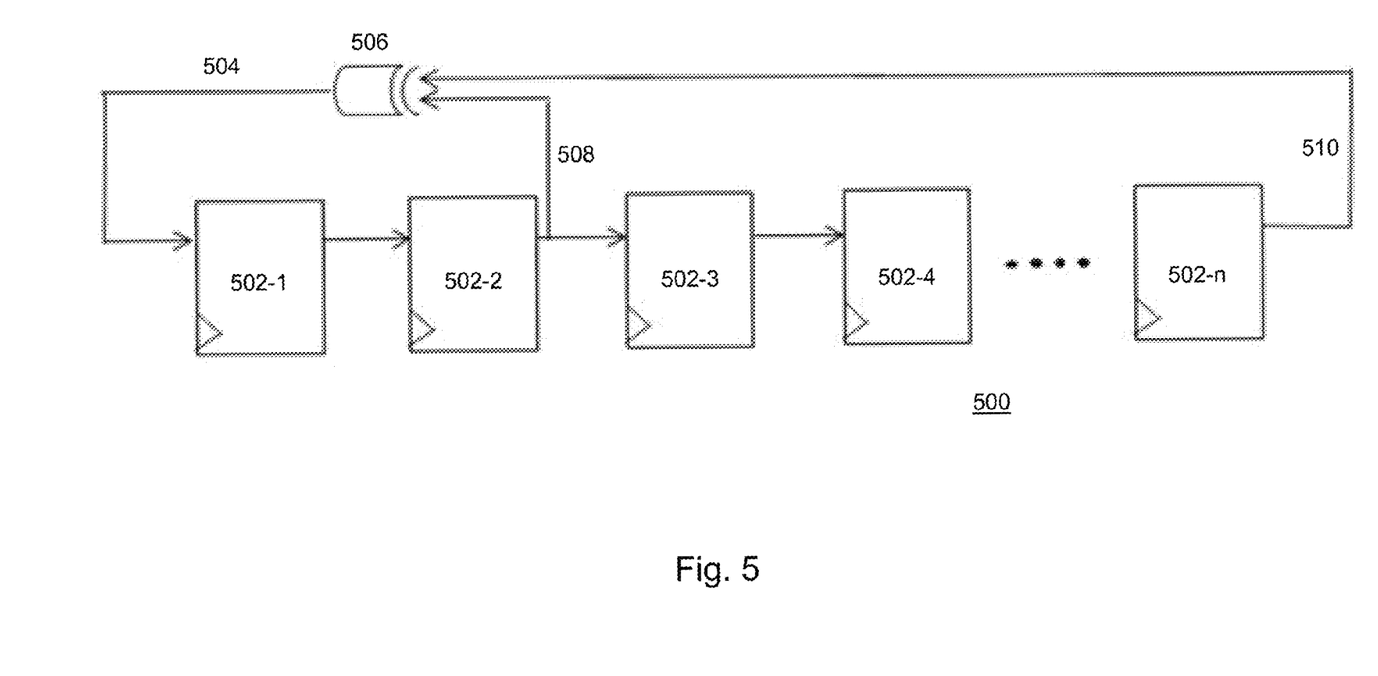
FIG. 5 is a block diagram of a linear feedback shift register counter as can be implemented according to an embodiment of the present invention.

Shown in FIG. 5 is an exemplary implementation of LFSR 402. As shown, LFSR 500 can be implemented as a cascade of latches 502-1 through 502-$n$ that form a shift register. As further shown, feedback 504 is provided by XOR 506 that receives inputs from taps 508 and 510 from the shift register. This enables LFSR 500 to cycle through a predetermined number of permutations based on the tap coefficients that are fed back. In an embodiment, the largest cycle that can be achieved is $2^{n1}$, where n is the number of taps in the LFSR.

A LFSR according to an embodiment of the present invention generates a pseudo random sequence. In an implementation, sequential values generated by the LFSR are meaningful if the tap coefficients are known. In an embodiment, however, only boundary values are of interest for the digital integrator. By implementing a LFSR as a counting device, embodiments of the present invention leverage increased performance, smaller area, and low power.

Figure 6:
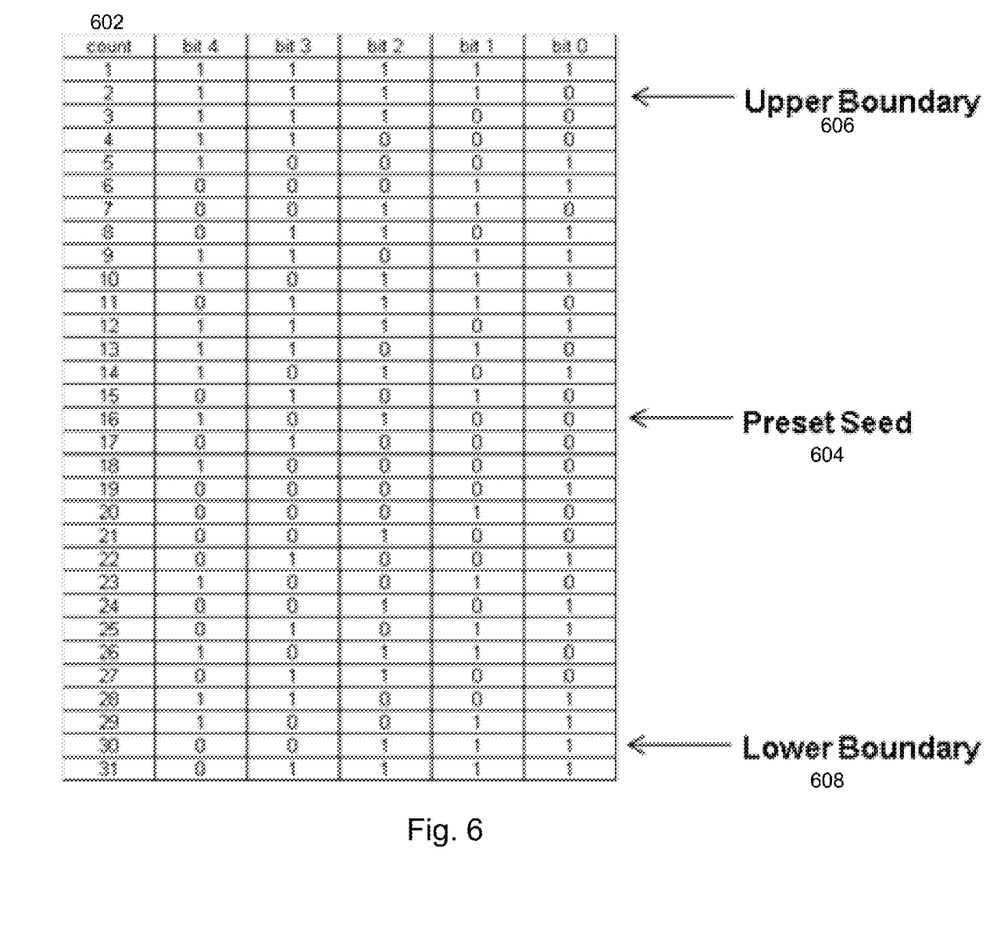
FIG. 6 is an example of a count sequence according to an implementation of the present invention.

The figure below illustrates an embodiment that uses LFSR 402 as a $2^5-1=31$ pseudo random sequence generator. Shown in FIG. 6 is the count sequence 602 for this implementation of LFSR 402. In this embodiment, to ensure that the integration boundary values are deterministic, initial seed value 604 (shown in FIG. 6) is loaded into LFSR 402 using Seed signal 410 (shown in FIG. 4).

In this embodiment, Digital Integrator Controller 404 (FIG. 4) is configured to detect when upper boundary 606 (FIG. 6) is reached. Responsively, Digital Integrator Controller asserts overflow signal 406 as shown in FIG. 4. To reset the count, Seed signal 410 with initial seed value 604 (FIG. 6) is again provided to LFSR 402.

In this embodiment, when decrement signal 414 (FIG. 4) is asserted, LFSR 402 responsively counts down as shown in the count sequence 602 of FIG. 6. When Digital Integrator Controller detects that lower boundary 608 (FIG. 6) has been reached, Digital Integrator Controller asserts Underflow signal 408. To reset the count, Seed signal 410 with initial seed value 604 (FIG. 6) is provided to LFSR 402.

In other embodiments, Digital Integrator Controller is further configured to load an initial seed value upon resetting the DFE circuitry, upon powering on the circuitry, or upon detection of invalid signals. Other embodiments are also possible as would be known to those of ordinary skill in the art.

Figure 7:
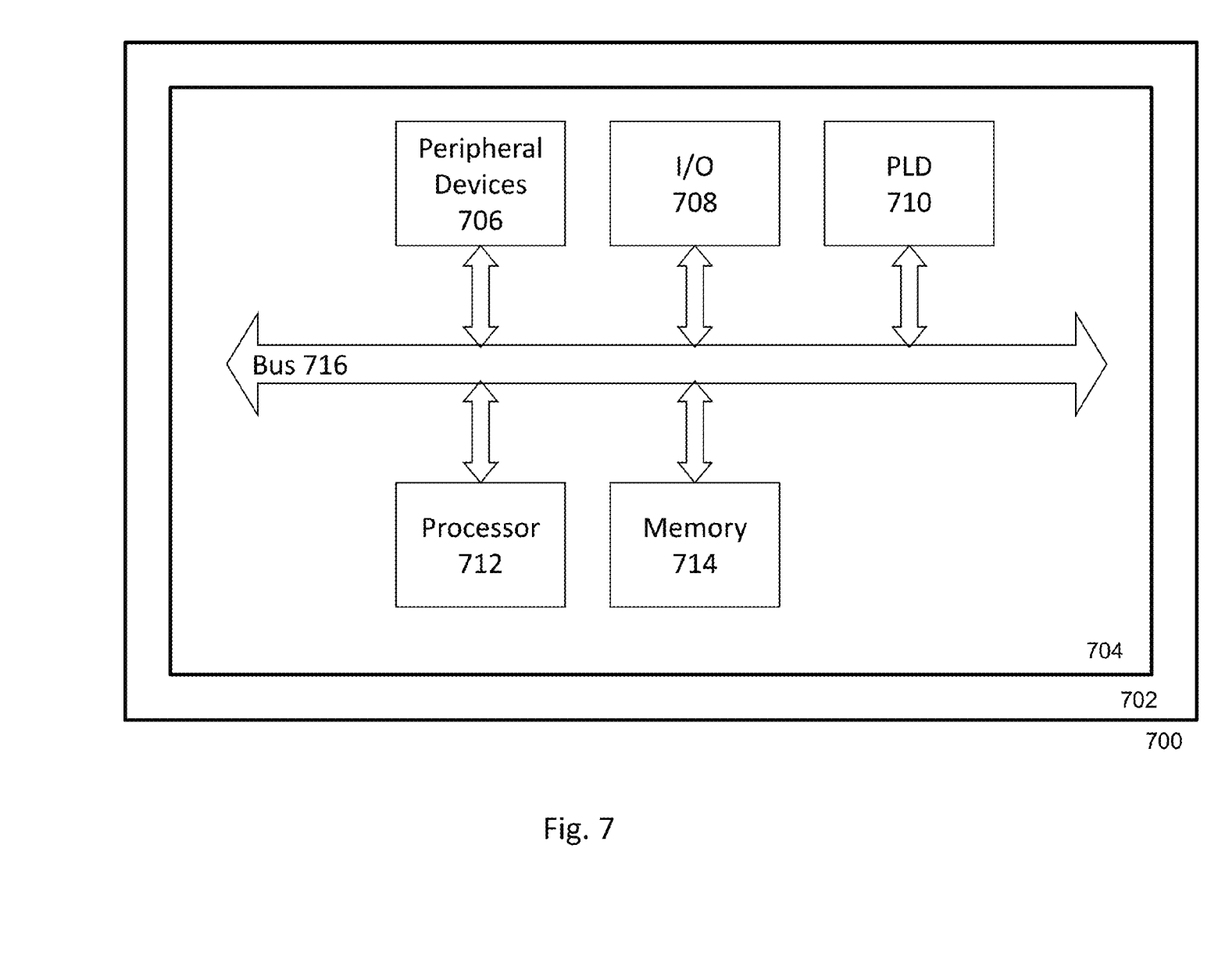
FIG. 7 is a simplified block diagram of an illustrative system employing a programmable logic device incorporating embodiments of the present invention.

An embodiment of the present invention is intended for implementation in a programmable logic device that can be implemented in a data processing system 700 such as shown in FIG. 7. Data processing system 700 may include one or more of the following components: processor 712; memory 714; I/O circuitry 708; and peripheral devices 706. These components are coupled together by system bus 716 and can be populated on a circuit board 704 which is contained in an end-user system 702.

System 700 can be used in a wide variety of applications, such as computer networking, data networking, instrumentation, video processing, digital signal processing, or any other application where the advantage of using programmable or reprogrammable logic is desirable. PLD 710 can be used to perform a variety of different logic functions. For example, PLD 710 can be configured as a processor or controller that works in cooperation with processor 712. PLD 710 may also be used as an arbiter for arbitrating access to a shared resource in system 700. In yet another example, PLD 710 can be configured as an interface between processor 712 and one of the other components in system 700. It should be noted that system 700 is only exemplary, and that the true scope and spirit of the invention should be indicated by the following claims.

Various technologies can be used to implement PLDs 700 as described above and incorporating in this invention. And although the invention has been described in the context of PLDs, it may be used with any programmable integrated circuit device.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

It should be appreciated by those skilled in the art that the specific embodiments disclosed above may be readily utilized as a basis for modifying or designing other write elements. It should also be appreciated by those skilled in the art that such modifications do not depart from the scope of the invention as set forth in the appended claims.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A decision feedback equalization circuit, comprising:
   a linear feedback shift register configured to count through a predetermined sequence;
   a digital integrator controller configured to detect a first predetermined boundary value from the linear feedback shift register, wherein the digital integrator is configured to output a first digital integrator control signal responsive to the detection of the first predetermined boundary value;
   a digital integrator configured to terminate integration responsive to the first digital integrator control signal.

2. The circuit of claim 1, wherein the linear feedback shift register is a pseudo random generator.

3. The circuit of claim 1, wherein the linear feedback shift register comprises at least two latches.

4. The circuit of claim 1, wherein the linear feedback shift register comprises at least one XOR circuit.

5. The circuit of claim 1, wherein the linear feedback shift register is configured to count up through the predetermined sequence.

6. The circuit of claim 5, wherein the first predetermined boundary value is a maximum count value.

7. The circuit of claim 1, wherein the linear feedback shift register is configured to count down through the predetermined sequence.

8. The circuit of claim 7, wherein the first predetermined boundary value is a minimum count value.

9. The circuit of claim 1, wherein the linear feedback shift register is configured to receive a first seed value.

10. The circuit of claim 1, wherein the linear feedback shift register is configured to receive a signal that inhibits counting by the linear feedback shift register.

11. A decision feedback equalization circuit, comprising:
    a counter configured to increment through a pseudo-random sequence of binary values;
    a digital integrator controller configured to detect a first predetermined boundary value from the counter, wherein the digital integrator is configured to output a first digital integrator control signal responsive to the detection of the first predetermined boundary value;
    a digital integrator configured to terminate integration responsive to the first digital integrator control signal.

12. The circuit of claim 11, wherein the counter is a pseudo random generator.

13. The circuit of claim 11, wherein the counter comprises at least two latches.

14. The circuit of claim 11, wherein the counter comprises at least one XOR circuit.

15. The circuit of claim 11, wherein the counter is configured to count up through the predetermined sequence.

16. The circuit of claim 15, wherein the first predetermined boundary value is a maximum count value.

17. The circuit of claim 11, wherein the counter is configured to count down through the predetermined sequence.

18. The circuit of claim 17, wherein the first predetermined boundary value is a minimum count value.

19. The circuit of claim 11, wherein the counter is configured to receive a first seed value.

20. The circuit of claim 11, wherein the counter is configured to receive a signal that inhibits counting by the linear feedback shift register.

21. A decision feedback equalization circuit, comprising:
    a digital integrator controller configured to receive a pseudo-random sequence of binary values, wherein the digital integrator is configured to output a first digital integrator control signal responsive to detection of the first predetermined boundary value;
    a digital integrator configured to terminate integration responsive to the first digital integrator control signal.

22. The circuit of claim 15, wherein the first predetermined boundary value is a maximum count value.

23. The circuit of claim 17, wherein the first predetermined boundary value is a minimum count value.

24. The circuit of claim 11, wherein the digital integrator controller is configured to detect an initial count value of the pseudo-random sequence of binary values.

* * * * *